(12) United States Patent
Danas et al.

(10) Patent No.: US 7,546,549 B2
(45) Date of Patent: Jun. 9, 2009

(54) CONSTRAINED CREATION OF DATA HIERARCHIES

(75) Inventors: Eric S. Danas, Sammamish, WA (US); Ian Tien, Seattle, WA (US); Corey Hulen, Sammamish, WA (US); R. Alan Blood, Duvall, WA (US); Chen-I Lim, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 444 days.

(21) Appl. No.: 11/274,661

(22) Filed: Nov. 15, 2005

(65) Prior Publication Data
US 2007/0112830 A1 May 17, 2007

(51) Int. Cl.
*G06F 3/048* (2006.01)
*G06F 17/00* (2006.01)

(52) U.S. Cl. .................. 715/825; 715/826; 707/102
(58) Field of Classification Search .................. 707/102; 715/825, 826
See application file for complete search history.

(56) References Cited

U.S. PATENT DOCUMENTS

| | | | | |
|---|---|---|---|---|
| 4,823,283 A * | 4/1989 | Diehm et al. | ............... | 715/825 |
| 5,625,783 A * | 4/1997 | Ezekiel et al. | ............. | 719/320 |
| 5,784,583 A * | 7/1998 | Redpath | ..................... | 715/841 |
| 5,950,168 A | 9/1999 | Simborg et al. | ................ | 705/3 |
| 5,953,726 A * | 9/1999 | Carter et al. | ........... | 707/103 R |
| 5,970,496 A * | 10/1999 | Katzenberger | .............. | 707/102 |
| 6,055,540 A * | 4/2000 | Snow et al. | ............ | 707/103 R |
| 6,098,066 A * | 8/2000 | Snow et al. | .................... | 707/3 |
| 6,185,550 B1 * | 2/2001 | Snow et al. | ..................... | 707/1 |
| 6,208,993 B1 * | 3/2001 | Shadmon | ..................... | 707/102 |
| 6,252,597 B1 | 6/2001 | Lokuge | ..................... | 345/353 |
| 6,356,899 B1 * | 3/2002 | Chakrabarti et al. | ........... | 707/5 |
| 6,397,222 B1 * | 5/2002 | Zellweger | ................... | 707/102 |
| 6,493,006 B1 * | 12/2002 | Gourdol et al. | ............. | 715/825 |
| 6,624,829 B1 * | 9/2003 | Beck et al. | .................. | 715/771 |
| 6,633,886 B1 * | 10/2003 | Chong | ........................ | 707/102 |
| 6,664,991 B1 * | 12/2003 | Chew et al. | ................. | 715/863 |
| 6,760,721 B1 * | 7/2004 | Chasen et al. | .................. | 707/3 |
| 6,925,608 B1 | 8/2005 | Neale et al. | ................. | 715/763 |

(Continued)

FOREIGN PATENT DOCUMENTS

EP   1 573 590 A2   9/2005

(Continued)

OTHER PUBLICATIONS

Ram, D. Janaki, et al., "Constraint Meta-Object: A New Object Model for Distributed Collaborative Designing", IEEE Transactions on Systems, Man and Cybernetics—Part A: Systems and Humans, vol. 27, No. 2, Mar. 1997, pp. 208-221.*

(Continued)

*Primary Examiner*—John E Breene
*Assistant Examiner*—Robert Stevens
(74) *Attorney, Agent, or Firm*—Merchant & Gould; Ryan T. Grace (57) ABSTRACT

A constrained user interface for selecting and creating categories (e.g., folders, properties) is provided in such a way as to prevent the creation of empty categories, or categories which are not associated with any underlying object or file. The user interface selectively enables and disables a remove category button, and also selectively enables and disables existing categories for selection.

20 Claims, 5 Drawing Sheets

U.S. PATENT DOCUMENTS

| | | | | |
|---|---|---|---|---|
| 6,948,125 | B2 | 9/2005 | Detweiler et al. | 715/713 |
| 6,961,731 | B2 | 11/2005 | Holbrook | 707/102 |
| 7,168,035 | B1* | 1/2007 | Bell et al. | 715/234 |
| 7,181,684 | B2* | 2/2007 | Chittu et al. | 715/255 |
| 7,310,783 | B2* | 12/2007 | Pagan | 715/840 |
| 7,337,440 | B1* | 2/2008 | Schmidt et al. | 717/169 |
| 2004/0103019 | A1 | 5/2004 | Reid et al. | 705/10 |
| 2004/0189707 | A1* | 9/2004 | Moore et al. | 345/777 |
| 2004/0243938 | A1* | 12/2004 | Weise et al. | 715/526 |
| 2005/0050210 | A1* | 3/2005 | Kennedy | 709/229 |
| 2005/0066293 | A1 | 3/2005 | Hunt | 715/854 |
| 2005/0076309 | A1* | 4/2005 | Goldsmith | 715/811 |
| 2005/0076312 | A1* | 4/2005 | Gardner et al. | 715/853 |
| 2005/0193268 | A1 | 9/2005 | Allor et al. | 714/38 |
| 2005/0246331 | A1* | 11/2005 | De Vorchik et al. | 707/3 |
| 2007/0239770 | A1* | 10/2007 | Enock et al. | 707/102 |

FOREIGN PATENT DOCUMENTS

| | | |
|---|---|---|
| IE | 000824 | 4/2002 |

OTHER PUBLICATIONS

Fenves, Gregory L., "Object-Oriented Programming for Engineering Software Development", Engineering with Computers, Springer-Verlag, New York, © 1990, pp. 1-15.*

Richards, Robert A., "Principle Hierarchy Based Intelligent Tutoring System for Common Cockpit Helicopter Training", ITS 2002, LCNS 2363, Springer-Verlag, Heidelberg, Germany, © 2002, pp. 473-483.*

DMReview; Covering Business Intelligence, Integration & Analytics, "The Power of Metrics: *Key Performance Indicators: The Multiple Dimensions*", http://www.dmreview.com/article_sub.cfm?articleId=1011028 Oct. 2004.

Lighthammer; KPI Manager, http://www.lighthammer.com/products/productsmain.htm Nov. 16, 2005.

Tektronix; Enabling Innovation, "UTRAN Network and Service Analyzer: Troubleshooting and Optimization Solution for 3G Networks and Services", http://www.tek.com/site/ps/0,,2F-18512-INTRO_EN,00.htm, Feb. 2005.

* cited by examiner

CONSTRAINED CREATION OF DATA HIERARCHIES

BACKGROUND

Hierarchical data structures are well known in the field of computer architecture and software. An exemplary tree-branch-leaf paradigm may be used to label, locate, and/or categorize records, files, and other data objects within a computer. Perhaps the best-known example of a hierarchical data structure is the folder-subfolder-file metaphor of certain file storage systems. Categorizing files using nested folders allows users to collocate and access related files within a common subfolder, and to collocate related subfolders within a common folder. In addition to Although most implementations of hierarchical data structures employ similar user interfaces and metaphors to represent these structures to end users, the mechanics of storing hierarchical information may vary greatly. For example, an implementation of the folder-subfolder-file metaphor will almost always be used when storing files as objects (i.e., collections of bits) in a memory. Folders and subfolders may be stored as additional objects in a memory, or merely as properties associated with the stored files.

When folders or categories are formed merely as properties of the objects they contain, then they may not otherwise exist, but for their association with one or more stored objects. One example of this folder-as-property implementation is a set of objects that are labeled using a hierarchy of categories and subcategories. Rather than the hierarchy being stored separately as a collection of objects in memory, a "category path" is stored with each object. One example of a category path is "Earth/USSR/Moscow." In the implementation described, a particular citizen may have this path stored as a property. No other hierarchy exists in storage, and the hierarchy of citizens can only be reconstructed based on the collection of paths stored with categorized objects. Using such an implementation, an "empty" category (i.e., one without an associated citizen) is not possible. Every category must be associated with an existing citizen in order to exist. Other implementations that do not use folder-as-property may also wish to prevent empty or unused categories. The advantage of a folder-as-property implementation is that hierarchies can be made to implicitly vary over time. For example, if a citizen may have a property "Earth/USSR/Moscow" in the year 1985 and "Earth/Russia/Moscow" in 2006. By reconstructing the hierarchy based on the properties on objects in a system, we can implicitly determine which folders are relevant. For example, in 2006, no citizens have "Earth/USSR" in their paths, and so USSR should not exist as a folder until an object is assigned this as a property.

Current interfaces used to navigate and modify hierarchical data structures allow for the creation of "empty" folders or categories. A user is able to create as many folders or categories as he or she wishes without ever populating files or objects therein. In a folder-as-property implementation, such empty folders are impermissible, but existing user interfaces cannot easily prevent a user from creating them.

There is a need in the art for a user interface that enables the creation and manipulation of a hierarchical data structure while enforcing rules preventing the creation of empty folders and categories.

SUMMARY

One or more embodiments provide a constrained user interface for selecting and creating categories (e.g., folders, properties) to prevent the creation of empty categories. When adding a new category, a remove button is disabled, and existing categories are disabled preventing their selection. When removing the newly added category, the remove button is disabled, and existing categories are re-enabled. Additional embodiments provide systems that implement such an interface.

BRIEF DESCRIPTION OF THE DRAWINGS

The foregoing brief summary, as well as the following detailed description, is better understood when read in conjunction with the accompanying drawings, which are included by way of example, and not of limitation with regard to the claimed invention. In the accompanying drawings, the same or similar elements are labeled with the same reference numbers.

DETAILED DESCRIPTION

Through the use of targeted enabling and disabling of controls in a user interface, software applications may prevent the creation of empty categories or folders in a hierarchical data structure. A user is only allowed to pick an existing category within a hierarchy, or create and pick a new category within the hierarchy. It should be noted that the term category as used throughout encompasses properties associated with objects, as well as hierarchies or paths associated with objects. The term category is not intended to be limited merely to conventional categories. Categories may include hierarchical properties associated with key performance indicators (KPIs) in an analysis software package.

Figure 1:
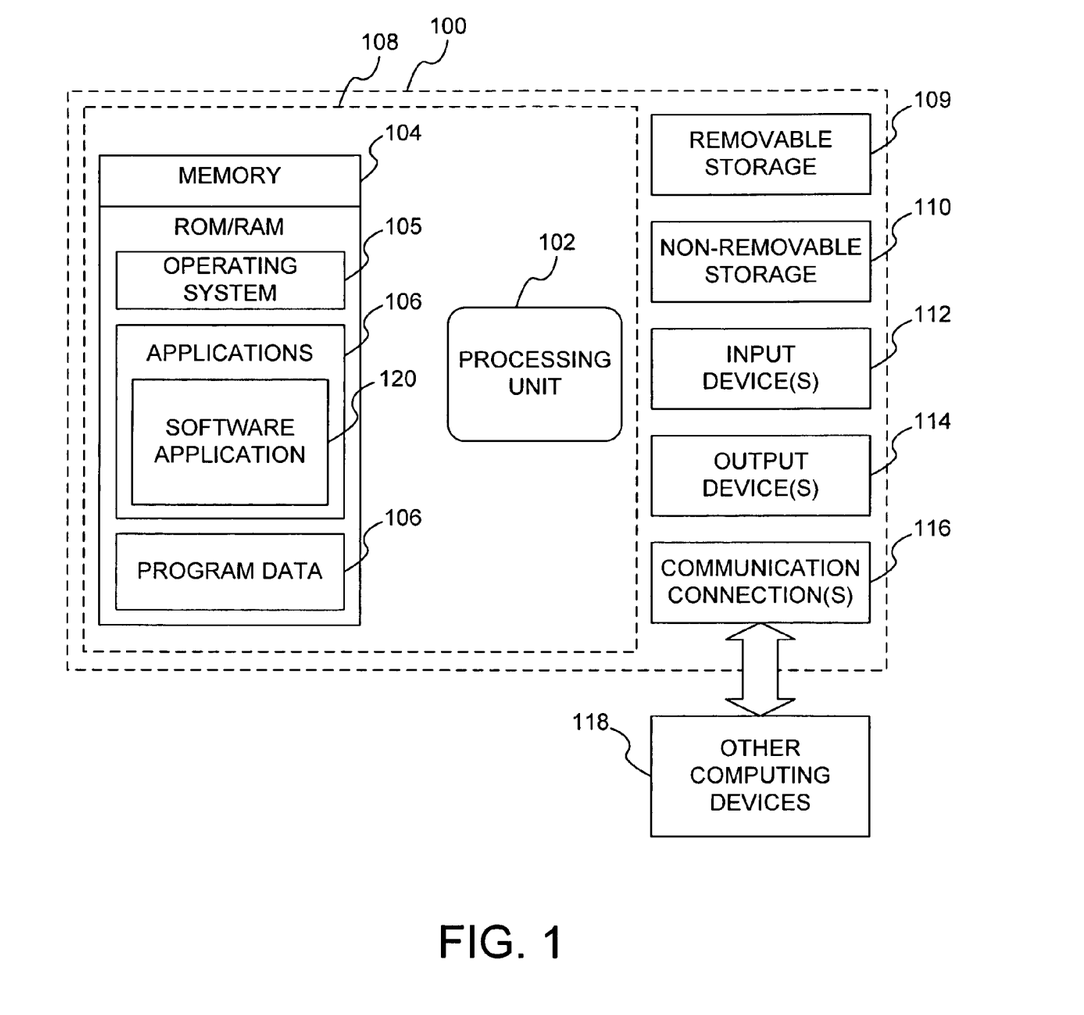
FIG. 1 depicts an exemplary operating environment in which one or more embodiments may be implemented.

FIG. 1 depicts an exemplary operating environment in which one or more embodiments may be implemented. The operating environment may comprise computing device 100 which may work alone or with other computing devices 118. Computing device 100 may comprise memory storage 104 coupled to processing unit 102. Any suitable combination of hardware, software, and/or firmware may be used to implement memory 104, processing unit 102 and other components. By way of example, memory 104, processing unit 102, and/or other components may be implemented within computing device 100 as shown, or may be implemented in combination with other computing devices 118. The systems, devices, and processors shown are used merely as examples.

Generally, program modules may include routines, programs, components, data structures, and other types of structures that perform particular tasks or implement particular abstract data types. Moreover, embodiments may be practiced with other computer system configurations, including hand-held devices, multiprocessor systems, microprocessor-based. or programmable consumer electronics, minicomputers, mainframe computers, set-top boxes, and so forth. Embodiments may also be practiced in distributed computing environments where tasks are performed by other computing devices 118 that are linked through a communications network. In a distributed computing environment, program modules may be located in both local and remote memory storage devices.

Embodiments, for example, may be implemented as a computer process or method (e.g., in hardware or in software), a computing system, or as an article of manufacture, such as a computer program product or computer readable media. The computer program product may be a computer storage media readable by a computer system and encoded with a computer program of instructions for executing a process on computing device 100. The computer program product may also be a propagated signal on a carrier readable by a computing system and subsequently stored on a computer readable medium on computing device 100.

With reference to FIG. 1, the embodiment shown may include a computing device, such as computing device 100. In a basic configuration, computer device 100 may include at least one processing unit 102, and memory 104. Depending on the configuration of the computer device, memory 104 may be volatile (e.g., Random Access Memory (RAM)), non-volatile (e.g., Read-Only Memory (ROM), Flash, etc.), or some combination thereof. Memory 104 may serve as a storage location for operating system 105, one or more applications 106, and may include program data 107, as well as other programs. Examples of operating system 105 are found in the family of WINDOWS operating systems from MICROSOFT CORPORATION of Redmond, Washington. In one embodiment, applications 106 may include software application 120.

Although the basic computing device configuration is contained within dashed-line box 108, computing device 100 may include additional features and functionality. For example, computing device 100 may include additional data storage components, including both removable storage 109 (e.g., floppy disks, memory cards, compact disc (CD) ROMs, digital video discs (DVDs), external hard drives, universal serial bus (USB) keys, etc.) and non-removable storage 110 (e.g., magnetic hard drives).

Computer storage media may include media implemented in any method or technology for storage of information, including computer readable instructions, data structures, program modules, or other data. Memory 104, removable storage 109, and non-removable storage 110 are all examples of computer storage media. Further examples of such media include RAM, ROM, electrically-erasable programmable ROM (EEPROM), flash memory, CD-ROM, DVD, cassettes, magnetic tape, magnetic disks, and so forth. Any such computer storage media may be accessed by components which are a part of computing device 100, or which are external to computing device 100 and connected via a communications link (e.g., Bluetooth, USB, parallel, serial, infrared, etc.). Computing device 100 may also include input devices 112, such as keyboards, mice, pens, microphone, touchpad, touch-display, etc. Output devices 114 may include displays, speakers, printers, and so forth. Additional forms of storage, input, and output devices may be utilized.

Computing device 100 may also include one or more communication connections 116 which allow the computing device to communicate with other computing devices 118, such as over a network (e.g., a local area network (LAN), the Internet, etc.). Communication media, in the form of computer readable instructions, data structures, program modules, or other data in a modulated data signal, may be shared with and by device 100 via communication connection 116. Modulated data signal may mean a signal that has one or more of its characteristics set or changed in such a manner as to encode information in the signal, and may include a modulated carrier wave or other transport mechanism. Communication connection 116 may be comprised of hardware and/or software enabling either a wired (e.g., Ethernet, USB, Token Ring, modem, etc.) or wireless (e.g., WiFi, WiMax, cellular, acoustic, infrared, radio frequency (RF), etc.) communication conduit with other devices 118.

Figure 2:
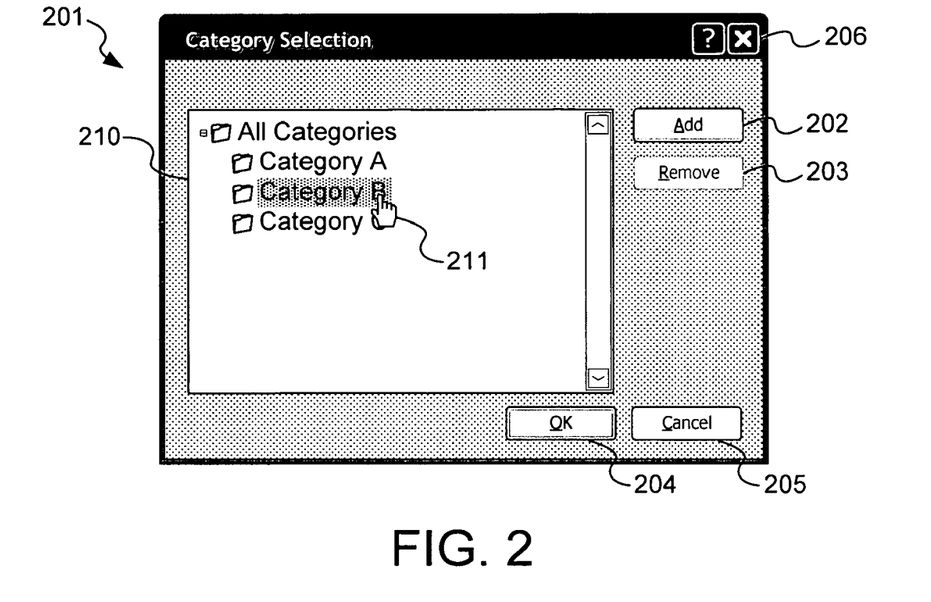
FIGS. 2-7 depict a user interface capable of preventing the creation of empty categories according to one or more embodiments.

FIG. 2 depicts a user interface 201 for selecting a category according to one or more embodiments of the invention. Interface 201 may be a separate displayed window as shown, or integrated into a larger interface (e.g., a web page or software application form). The interface can be used, for example, to assign a category or category path to an object. If a user has just created a new object, and is categorizing the object, interface 201 may be used to create a new category or to assign an already-existing category.

The basic elements of interface 201 include an Add button 202, a Remove button 203, an OK button 204, a Cancel button 205, a Close button 206, and an interactive tree control 210. Cancel button 205 and Close button 206 may be used simply to close interface 201 without taking further action. Elements shown here may be replaced with other types of controls, such as menu items, shortcut keys, check boxes, and so forth. Tree control 210 may be populated with a visual representation of a hierarchical data structure, here a tree of categories.

When interface 201 is initially loaded, the tree of categories may be populated using the superset of category path properties of existing objects. For other implementations, alternative methods may be used to populate the tree. Each of the categories in tree control 210 is enabled or selectable by the user. At the same time, Remove button 203 is disabled, preventing a user from removing a category that is already associated with another object. Disabled buttons may be signified by a grayed-out appearance. A default category may be automatically selected when interface 201 is initiated. Alternatively, a category already assigned to a relevant object may be selected. A user interacting with interface 201 using a pointing device can manipulate cursor 211 and select a category, as shown here.

Figure 3:
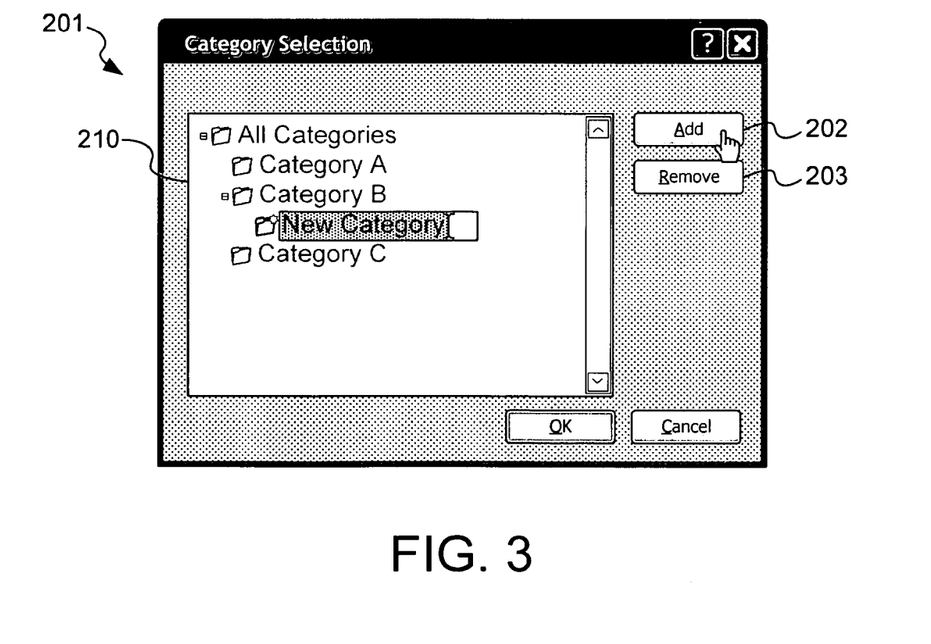

FIG. 3 depicts user interface 201 after a user has sent an Add command according to one or more embodiments of the invention. Here, the user issues the Add command by clicking on Add button 202. Additional embodiments may receive an Add command using a shortcut key (e.g., "A"), speaking a voice command, or otherwise receiving input. When a user clicks the Add button 202, a new subcategory is created under the presently selected category and the new category is selected, as shown here (i.e., "New Category" under "Category B"). When this occurs, all other categories in tree control 210 are disabled (i.e., "All Categories," "Category A," "Category B," "Category C"). Disabled categories may be signified by a grayed-out appearance. The user can no longer select any categories other than the one just created for assignment. This prevents new categories from being created but never assigned, leaving an empty category. In addition to enabling the new category, and disabling all other categories, Remove button 203 is now enabled. The selected new category can be removed as easily as it was created.

Figure 4:
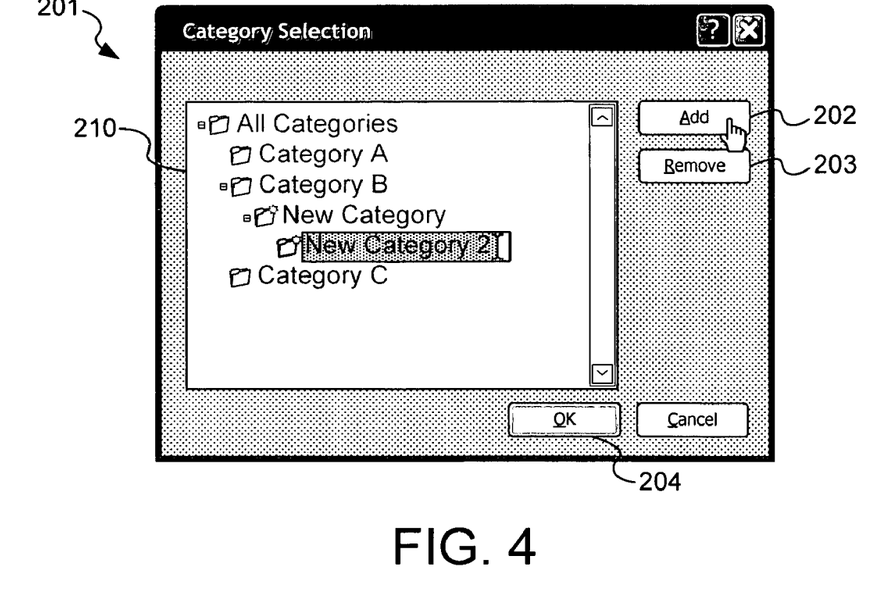

FIG. 4 depicts user interface 201 after a user has sent a second Add command according to one or more embodiments of the invention. While the initial new category was selected, a user has clicked Add button 202 a second time, creating "New Category 2" under "New Category." The second new category is selected, and the initial categories in tree control 210 are disabled. The first new category is also disabled, preventing its selection or removal. At this point, a user can only click OK button 204 to assign the second new category, click Add button 202 to add a third subcategory, click Remove button 203 to remove the second new category (and re-select the first new category), or click the Cancel or Close buttons to exit without making changes.

Figure 5:
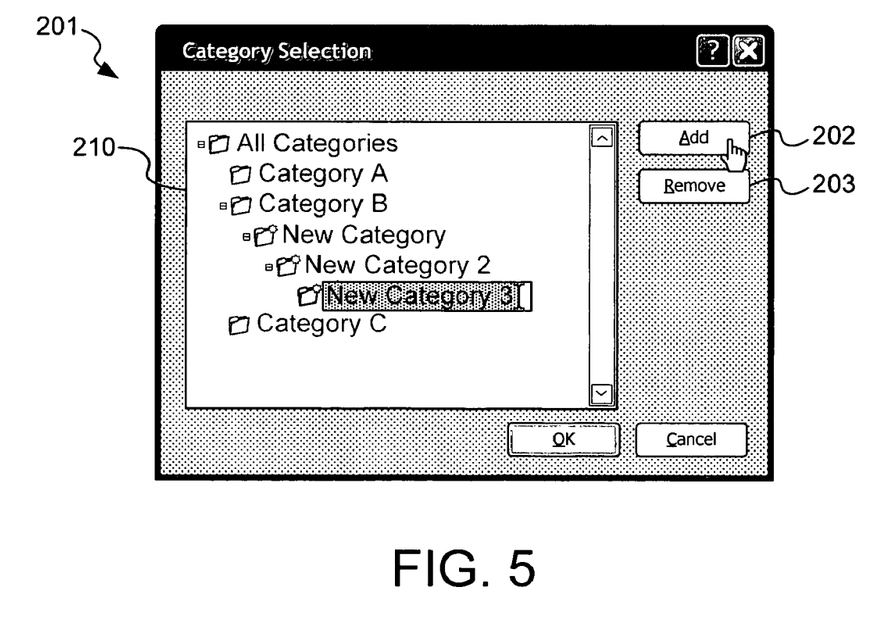

FIG. 5 depicts user interface 201 after a user has sent a third Add command according to one or more embodiments of the invention. With "New Category 2" selected, the user sent another Add command, creating "New Category 3" as a subcategory. The new category is again selected, and the previous category is disabled. As each new category is added, Remove button 203 remains enabled. Additional categories may similarly be added underneath new categories, although possibly subject to some programmatically imposed limitation as to the depth of new categories.

Figure 6:
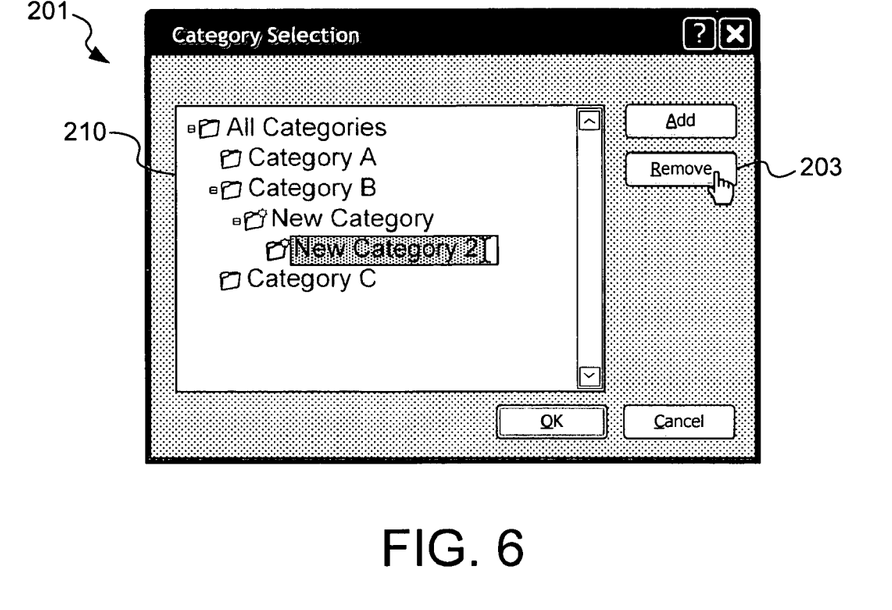

FIG. 6 depicts user interface 201 after a user has sent a Remove command according to one or more embodiments of the invention. A user has sent a Remove command by clicking on Remove button 203, deleting the most recently added category. The previous new category is selected, and the rest of the categories remain disabled. Were a user to remove all newly added categories, then the remaining (i.e., existing) categories would be re-enabled, and Remove button 203 would again be disabled.

Figure 7:
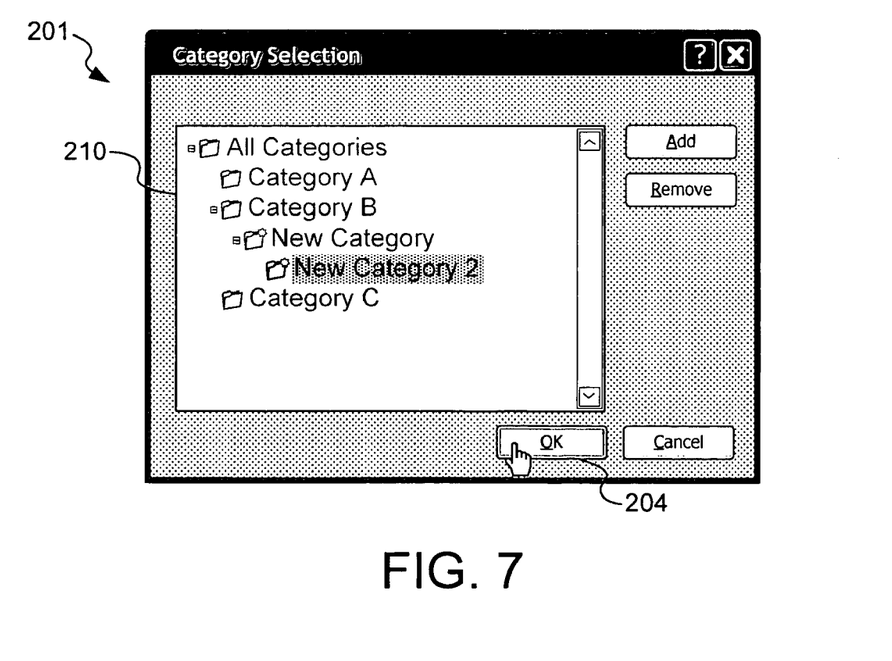

FIG. 7 depicts user interface 201 when a user has completed the selection of a category according to one or more embodiments of the invention. The user signifies the final selection by clicking on OK button 204. This serves to assign and/or apply the currently selected category to whatever underlying object is being categorized.

Figure 8:
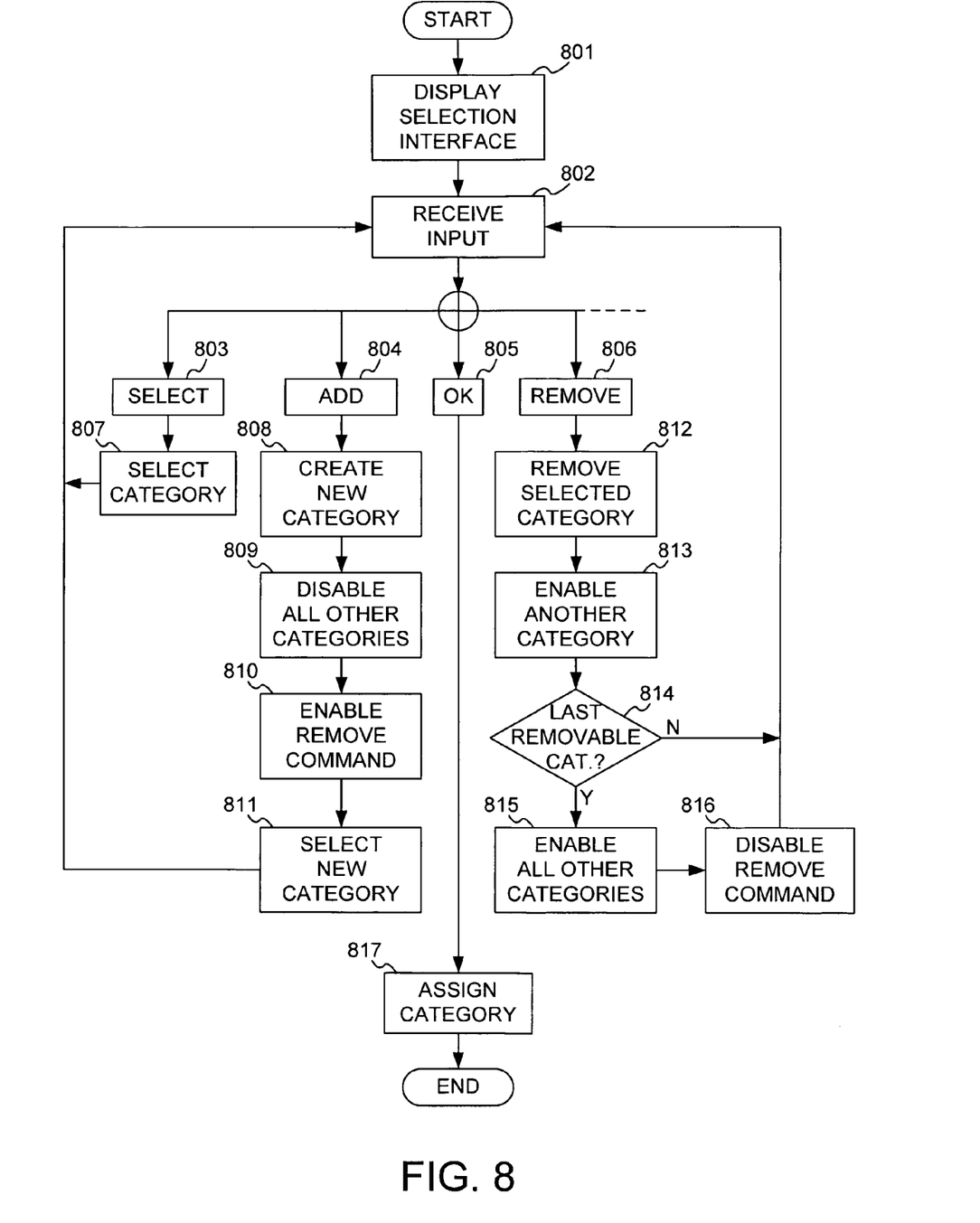
FIG. 8 is a flowchart depicting a method for preventing the creation of empty categories according to one or more embodiments.

FIG. 8 is a flowchart depicting a method for preventing the creation of empty categories according to one or more embodiments. The functional blocks represents steps in a process. The steps need not necessarily be performed in the order displayed, however. Likewise, steps may be combined, modified, deleted, and so forth, and yet embodiments may still fall within the scope of the appended claims.

At step 801, a user interface 201 is displayed, either as a stand-alone dialog or as a portion of a larger interface. The interface 201 may or may not include a hierarchical category tree. Alternatively, a simple list or collection of icons may be used to represent the existing categories (or folders, or other property/metaphor). Initially, the list or tree may reflect the universe of already existing categories. This list or tree may be maintained as a separate collection of objects, or as properties or paths associated with a set of underlying objects. Interface 201 may additionally include command buttons or menu items serving to prompt and control modifications to the list or tree of categories. Initially, some commands may be disabled in order to prevent the creation of empty or unassigned categories. For example, if the list or tree includes all of the currently existing categories, and a new object is to be assigned a category, then a Remove button may be disabled to prevent the deletion of a category already assigned to another object. An initial category may be selected to indicate a default or suggested choice for the object.

Alternatively, if interface 201 is displayed for the purpose of reassigning a different category to an object already having a category assigned, then the Remove button may be enabled, assuming no other object has the category assigned to it. If such is the case, then the already assigned category is selected in the list or tree, and all other assigned categories are disabled. This forces the user to remove the existing category before selecting another category, or to add a subcategory under the selected category. If the category presently assigned to the object is associated with another category, then the Remove command will be disabled as before, and the other categories in the list will be enabled to allow reassignment.

It should be noted that already assigned categories include all parent categories associated with a particular assigned subcategory. For example, a particular animal may be assigned the category path of "All Animals/Dogs/Sight Hounds/Whippets." Although the ultimate subcategory associated with this animal would be "Whippets," all related parent categories (i.e. Dogs and Sight Hounds) would be considered assigned, and therefore would not be removable if any other animal includes them in their category path.

Once interface 201 is set up and displayed, at step 802, a displaying computer may await input from a user of the computer. Input may come in the form of a clicked link or button, a keyboard or text command, an audio command, and so forth. Depending on the input received, a number of subsequent actions may be initiated; each action designed to constrain category creation and deletion with the aim of preventing empty or unassigned categories. This input may include a selection 803, an addition 804, an assignment 805, or a removal 806. Additional input (not shown) may include a Cancel or Close command, a Help command, or keyboard input may be used to rename a category.

If enabled, a user may select any of the categories from the list or tree, as indicated in step 803. In response, the category may be selected at step 807, and the displaying computer will await further input. If a user chooses to add a new category at step 808, a new category will be created at step 809, possibly as a subcategory of another category, or as a new base category. Once a new category is created, at step 809 all other categories are disabled in order to prevent selection (if they're not already disabled). If not previously enabled, the Remove command is enabled at step 810 to allow the removal of the newly created category. The new category is selected at step 811, and the displaying computer will again await further input.

If enabled, a user may choose to remove a newly added or previously created category at step 806. If so, the category at step 812 is removed from the list or tree and the parent (or another) category is selected at step 813. At decision 814, it is determined whether the recently removed category was the last removable category (e.g., if it was the last in a chain of nested subcategories). If there are additional empty categories to be removed before proceeding, then no further action is taken and the displaying computer awaits further input. If the removed category was the last removable one, then at step 815, all other categories are re-enabled for possible selection, and at step 816, the Remove command is again disabled before further input is accepted back at step 802.

If, at step 805, a user selects "OK" or "Assign" or otherwise commands that the selection or assignment of a category be made, then at step 817, the category is appropriately assigned.

While methods and systems embodying the present invention are shown by way of example, it will be understood that the invention is not limited to these embodiments. The methods and systems described are merely examples of the invention, the limits of which are set forth in the claims which follow. Those skilled in the art may make modifications, particularly in light of the foregoing teachings.

We claim:

1. A computer-implemented method for constraining the generation of a hierarchical structure of categories, the method comprising:

displaying a hierarchical structure of existing categories in a user interface, wherein each of the existing categories are enabled for selection, wherein the user interface includes an add button configured to add a category to the hierarchical structure, wherein the user interface includes a remove button configured to remove a category from the hierarchical structure, wherein selection capabilities of the remove button are initially disabled;

receiving a selection of a first category in the hierarchical structure;

after receiving the selection of the first category in the hierarchical structure, receiving a selection of the add button;

in response to receiving the selection of the add button.
automatically creating a first sub-category of the first category,
automatically disabling selection capabilities for each of the other categories in the hierarchical structure beside the first subcategory, and
automatically enabling the selection capabilities of the remove button;

receiving a selection of the remove button after the remove button is automatically enabled;

in response to receiving the selection of the remove button,
automatically removing the first sub-category of the first category,
automatically enabling selection capabilities for each of the other categories in the hierarchical structure, and
automatically disabling selection capabilities of the remove button.

2. The computer-implemented method of claim 1, wherein the hierarchical structure is a folder-sub-folder structure.

3. The computer-implemented method of claim 2, wherein the hierarchical structure is a folder-as-property hierarchical structure.

4. The computer-implemented method of claim 2, wherein the categories are properties associated with objects.

5. The computer-implemented method of claim 2, wherein the categories are associated with properties that are associated with key performance indicators.

6. The computer-implemented method of claim 2, wherein the user interface further includes an OK button, wherein selection of the OK button assigns a category to the hierarchical structure.

7. A computer-readable storage medium having computer-executable instructions for constraining the generation of a hierarchical structure of categories, the instructions comprising:

displaying a hierarchical structure of categories in a user interface, wherein each of the categories are enabled for selection, wherein the user interface includes an add button configured to add a category to the hierarchical structure, wherein the user interface includes a remove button configured to remove a category from the hierarchical structure, wherein selection capabilities of the remove button are disabled;

receiving a selection of a first category in the hierarchical structure:

after receiving the selection of the first category in the hierarchical structure, receiving a selection of the add button;

in response to receiving the selection of the add button,
automatically creating a first sub-category of the first category,
automatically disabling selection capabilities for each of the other categories in the hierarchical structure beside the first sub-category, and
automatically enabling the selection capabilities of the remove button.

8. The computer-readable storage medium of claim 7, further comprising:
receiving a second selection of the add button;
in response to receiving the Second selection of the add button,
automatically creating a second sub-category of the first category, and
automatically disabling selection capabilities for each of the other categories in the hierarchical structure beside the second sub-category.

9. The computer-readable storage medium of claim 8, further comprising:
receiving a selection of the remove button after receiving the second selection of the add button;
in response to receiving the selection of the remove button,
automatically removing the second sub-category of the first category, and
automatically enabling selection capabilities for the first sub-category while maintaining the disabled selection capabilities for each of the other categories in the hierarchical structure beside the first sub-category.

10. The computer-readable storage medium of claim 7, wherein the hierarchical structure is a folder-subfolder structure.

11. The computer-readable storage medium of claim 7, wherein the hierarchical structure is a to folder-as-property hierarchical structure.

12. The computer-readable storage medium of claim 7, wherein the categories are properties associated with objects.

13. The computer-readable storage medium of claim 7, wherein the categories are associated with properties that are associated with key performance indicators.

14. The computer-readable storage medium of claim 7, wherein the user interface further includes an OK button, wherein selection of the OK button assigns a category to the hierarchical structure.

15. A system for constraining the generation of a hierarchical structure of categories, the system comprising:
a processor; and
a memory having computer-executable instructions stored thereon, wherein the computer-executable instructions:
display, on a hardware device, a hierarchical structure of existing categories in a user interface, wherein each of the existing categories is enabled for selection, wherein the user interface includes an add button configured to add a category to the hierarchical structure, wherein the user interface includes a remove button configured to remove a category from the hierarchical structure, wherein selection capabilities of the remove button are initially disabled;
receive a selection of a first category in the hierarchical structure;
after receiving the selection of the first category in the hierarchical structure, receive a selection of the add button;
in response to receiving the selection of the add button,
automatically create a first sub-category of the first category,
automatically disable selection capabilities for each of the other categories in the hierarchical structure beside the first sub-category,
automatically enable the selection capabilities of the remove button;
receive a second selection of the add button;
in response to receiving the second selection of the add button,
automatically create a second sub-category of the first category,
automatically disable selection capabilities for each of the other categories in the hierarchical structure beside the second sub-category;
receive a selection of the remove button after receiving the second selection of the add button;

in response to receiving the selection of the remove button,
    automatically remove the second sub-category of the first category, and
    automatically enable selection capabilities for the first sub-category while maintaining the disabled selection capabilities for each of the other categories in the hierarchical structure beside the first sub-category.

16. The system of claim 15, wherein the hierarchical structure is a folder-sub-folder structure.

17. The system of claim 15, wherein the hierarchical structure is a folder-as-property hierarchical structure.

18. The system of claim 15, wherein the categories are properties associated with objects.

19. The system of claim 15, wherein the categories are associated with properties that are associated with key performance indicators.

20. The system of claim 15, wherein the user interface further includes an OK button, wherein selection of the OK button assigns a category to the hierarchical structure.

* * * * *